US008572405B2

(12) United States Patent
Kerschbaum (10) Patent No.: US 8,572,405 B2
(45) Date of Patent: Oct. 29, 2013

(54) COLLUSION-RESISTANT OUTSOURCING OF PRIVATE SET INTERSECTION

(75) Inventor: Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 78 days.

(21) Appl. No.: 13/421,103

(22) Filed: Mar. 15, 2012

(65) Prior Publication Data

US 2013/0246802 A1 Sep. 19, 2013

(51) Int. Cl.
*G06F 11/30* (2006.01)

(52) U.S. Cl.
USPC ........................................... 713/189; 380/255

(58) Field of Classification Search
None
See application file for complete search history.

(56) References Cited

U.S. PATENT DOCUMENTS

| | | | |
|---|---|---|---|
| 2004/0187018 A1* | 9/2004 | Owen et al. ................... | 713/200 |
| 2013/0010950 A1* | 1/2013 | Kerschbaum ................... | 380/30 |

OTHER PUBLICATIONS

Florian Kerschbaum, Collusion-Resistant Outsourcing of Private Set Intersection, Proceedings of the SAC'12, Mar. 25-29, 2012, 6 pages.
Giuseppe Ateniese et al., "(If) Size Matters: Size-Hiding Private Set Intersection," Proceedings of the 14th International Conference on Practice and Theory in Public Key Cryptography, IACR PKC 2011, Mar. 2011, 14 pages.
Mihir Bellare et al., "Deterministic and Efficiently Searchable Encryption," Proceedings of the 27th Annual International Cryptology Conference, Advances in Cryptology—CRYPTO'07, Lecture Notes in Computer Science 4622, Aug. 2007, pp. 535-552.
Dan Boneh et al., "Public Key Encryption with Keyword Search," Proceedings of the 23rd Annual International Conference on the Theory and Applications of Cryptographic Techniques, EUROCRYPT'04, Lecture Notes in Computer Science 3027, May 2004, 15 pages.
Dan Boneh et al., "Efficient Generation of Shared RSA Keys," Journal of the ACM, vol. 48, Issue 4, Jul. 2001, pp. 702-722.
David Chaum, "Blind Signatures for Untraceable Payments," Advances in Cryptology: Proceedings of CRYPTO'82, Aug. 1982, pp. 199-203.
Kai-Min Chung et al., "Improved Delegation of Computation Using Fully Homomorphic Encryption," Proceedings of the 30th Annual Conference on Advances in Cryptology, CRYPTO'10, Apr. 2010, pp. 483-501.
Dana Dachman-Soled et al., "Efficient Robust Private Set Intersection," Proceedings of the 7th International Conference on Applied Cryptography and Network Security, ACNS 2009, Lecture Notes in Computer Science 5536, Jun. 2009, pp. 125-142.
Emiliano De Cristofaro et al., "Linear-Complexity Private Set Intersection Protocols Secure in Malicious Model," Proceedings of the 16th International Conference on the Theory and Application of Cryptology and Information Security, ASIACRYPT 2010, Dec. 2010, pp. 213-231.

(Continued)

*Primary Examiner* — Andrew L Nalven
*Assistant Examiner* — Mohammed Waliullah
(74) *Attorney, Agent, or Firm* — Fish & Richardson P.C.

(57) ABSTRACT

Implementations of the present disclosure include methods, systems, and computer-readable storage mediums for receiving an encrypted first data set from a first entity, storing the encrypted first data set in computer-readable memory, receiving an encrypted second data set from a second entity, storing the encrypted second data set in computer-readable memory, receiving public encryption information associated with the encrypted first data set and the encrypted second data set, storing the public encryption information in computer-readable memory, and processing, using the one or more processors, the encrypted first data set and the encrypted second data set to provide the set intersection, wherein an advantage of a first adversary in guessing data elements of the encrypted first data set is negligible in a security parameter.

20 Claims, 5 Drawing Sheets

(56) References Cited

OTHER PUBLICATIONS

Emiliano De Cristofaro et al., "Efficient Techniques for Privacy-preserving Sharing of Sensitive Information," Proceedings of the 4th International Conference on Trust and Trustworthy Computing, TRUST 2011, Jun. 2011, 16 pages.

Emiliano De Cristofaro et al., Practical Private Set Intersection Protocols with Linear Complexity, Proceedings of the 14th International Conference on Financial Cryptography and Data Security, FC'10, Jan. 2010, 17 pages.

Marten van Dijk et al., "On the Impossibility of Cryptography Alone for Privacy-Preserving Cloud Computing," Proceedings of the 5th USENIX Workshop on Hot Topics in Security, USENIX Security'10, HotSec'10, Aug. 2010, 6 pages.

Yair Frankel et al., "Robust Efficient Distributed RSA-Key Generation," Proceedings of the 30th ACM Symposium on Theory of Computing, STOC'98, May 1998, 10 pages.

Michael J. Freedman et al., "Keyword Search and Oblivious Pseudorandom Functions," Proceedings of the 2nd Theory of Cryptography Conference, TCC 2005, Lecture Notes in Computer Science 3378, Feb. 2005, 21 pages.

Michael J. Freedman et al., "Efficient Private Matching and Set Intersection," Proceedings of EUROCRYPT 2004, Lecture Notes in Computer Science 3027, May 2004, 18 pages.

Rosario Gennaro et al., "Non-interactive Verifiable Computing: Outsourcing Computation to Untrusted Workers," Proceedings of 30th International Cryptology Conference, CRYPTO 2010, Aug. 2010, 18 pages.

Craig Gentry, "Fully Homomorphic Encryption using Ideal Lattices," Proceedings of the 41st ACM Symposium on Theory of Computing, STOC'09, May 2009, pp. 169-178.

Shafi Goldwasser et al., "Probabilistic Encryption," Journal of Computer and Systems Science, vol. 28, No. 2, Apr. 1984, pp. 270-299.

Hakan Hacigumus et al., "Executing SQL over Encrypted Data in the Database-Service-Provider Model," Proceedings of the ACM Symposium on Principles Database and Systems, ACM SIGMOD'2002, Jun. 2002, pp. 216-227.

Hakan Hacigumus et al., "Providing Database as a Service," Proceedings of the 18th International Conference on Data Engineering, ICDE'02, Feb.-Mar. 2002, 10 pages.

Carmit Hazay et al., "Efficient Protocols for Set Intersection and Pattern Matching with Security Against Malicious and Covert Adversaries," Proceedings of the 5th Theory of Cryptography Conference, TCC 2008, Mar. 2008, 20 pages.

Carmit Hazay et al., "Efficient Set Operations in the Presence of Malicious Adversaries," Proceedings of the 13th International Conference on Practice and Theory in Public Key Cryptography, PKC 2010, May 2010, Lecture Notes in Computer Science 6056, 40 pages.

Stanislaw Jarecki et al., "Efficient Oblivious Pseudorandom Function with Applications to Adaptive OT and Secure Computation of Set Intersection," Proceedings of the 6th Theory of Cryptography Conference, TCC 2009, Mar. 2009, 18 pages.

Lea Kissner et al., "Privacy-Preserving Set Operations," Proceedings of the 25th Annual International Cryptology Conference, CRYPTO 2005, Aug. 2005, 17 pages.

Moni Naor et al., "Oblivious Transfer and Polynomial Evaluation," Proceedings of the 31st Symposium on Theory of Computer Science, STOC'99, 1999, pp. 245-254.

Mariana Raykova et al., "Secure Anonymous Database Search," Proceedings of the ACM Cloud Computing Security Workshop, CCSW 2009, Nov. 2009, 4 pages.

R.L. Rivest et al., "A Method for Obtaining Digital Signatures and Public-Key Cryptosystems," Communications of the ACM, vol. 21, Issue 2, Feb. 1978, 15 pages.

Dawn Xiaodong Song et al., "Practical Techniques for Searches on Encrypted Data," Proceedings of IEEE Symposium on Security and Privacy, SP'00, May 2000, 12 pages.

Andrew C. Yao, "Protocols for Secure Computations," Proceedings of the IEEE Symposium on Foundations of Computer Science, SFCS '08, 1982, 5 pages.

Pascal Paillier, Public-Key Cryptosystems Based on Composite Degree Residuosity Classes, Proceedings of the International Conference on the Theory and Application of Cryptographic Techniques, Advances in Cryptology—EUROCRYPT '99, May 1999, Lecture Notes in Computer Science 1592, pp. 223-238.

Dan Boneh et al., "Evaluating 2-DNF Formulas on Ciphertexts," Proceedings of the Theory of Cryptography, Second Theory of Cryptography Conference, TCC 2005, Lecture Notes in Computer Science 3378, pp. 325-341, Feb. 2005.

H. Garcia-Molina, J. Ullman, and J. Widom. Database Systems: The Complete Book. Prentice Hall, 2008.

O. Goldreich. Foundations of Cryptography: Basic Applications. Cambridge University Press, 2004.

Introduction to Data Mining. P. Tan, M. Steinbach, and V. Kumar. Addison-Wesley, 2005.

J. Vaidya, C. Clifton, and Y. Zhu. Privacy Preserving Data Mining. Sprinter—Advances in Information Security 19, 2006.

Marc Fischlin et al., "Secure Set Intersection with Untrusted Hardware Tokens," Topics in Cryptology A CT-RSA 2011, Springer Berlin Heidelberg, Feb. 14, 2011, 16 pages.

Stanislaw Jarecki et al., "Fast Secure Computation of Set Intersection," Security and Cryptography for Networks, Springer Berlin Heidelberg, Sep. 13, 2010, pp. 418-435.

Partial European Search Report for European Patent Application No. EP13000668, Jul. 17, 2013, 7 pages.

* cited by examiner

COLLUSION-RESISTANT OUTSOURCING OF PRIVATE SET INTERSECTION

BACKGROUND

Private set intersection (PSI) can enable parties, such as a client and a server, to compute the intersection of elements included within their respective sets without disclosing any information about these elements. During this process, the client can learn the intersection of elements within the sets, whereas the server does not learn the intersection of elements within the sets. PSI has many applications and is therefore a fundamental building block for many search-based computing technologies, such as medical databases, law enforcement systems that search forensic databases storing DNA profiles or supply chain management systems that involve individual parties with various roles.

SUMMARY

Implementations of the present disclosure include computer-implemented methods for determining a set intersection using a third party. In some examples, the methods are performed using one or more processors and including the actions of receiving an encrypted first data set from a first entity, storing the encrypted first data set in computer-readable memory, receiving an encrypted second data set from a second entity, storing the encrypted second data set in computer-readable memory, receiving public encryption information associated with the encrypted first data set and the encrypted second data set, storing the public encryption information in computer-readable memory, and processing, using the one or more processors, the encrypted first data set and the encrypted second data set to provide the set intersection, wherein:

$$Adv_A < \frac{1}{\text{poly}(\lambda)}$$

where:
$\lambda$ is a security parameter; and
$Adv_A$ is provided as an advantage of a first adversary in guessing data elements of the encrypted first data set and is determined based on a probability of the first adversary guessing the data elements and a second adversary guessing the data elements, the first adversary comprising the third party and the second entity, and the second adversary having access to the encrypted first data set and the public encryption information.

In some implementations, $Adv_A$ is calculated as:

$Pr[A(S)=x-A'(pk, c)=x]$ where:
A is the first adversary;
S represents messages of the first entity received by the third part;
A' is the second adversary;
pk is the public encryption information;
c is an encrypted data element included in the encrypted first data set; and
x is a correct guess of a value of an unencrypted data element associated with the encrypted data element.

In some implementations, a first data set is encrypted using a key to provide the encrypted first data set and a second data set is encrypted using the key to provide the encrypted second data set. The first data set and the second data set are each encrypted based on a keyed hash function using the key. Processing the encrypted first data set and the encrypted second data set to provide the set intersection includes: calculating a cross-product of the encrypted first data set and the encrypted second data set to provide a plurality of bit strings, each bit string associated with an encrypted data element pair including an encrypted data element of the encrypted first data set and an encrypted data element of the encrypted second data set; and for one or more encrypted data element pairs: determining that first l bits of an associated bit string are each equal to a first value and, in response, adding next m bits of the associated bit string as a data element of the set intersection. The first value is zero. The m bits of the associated bit string defines an unencrypted data element that is included in each of the first data set and the second data set.

In some implementations, the encrypted first data set is encrypted based on a first exponent ($d_1$) and the encrypted second data set is encrypted based on a second exponent ($d_2$), the first entity receiving the first exponent ($d_1$) and a third exponent (f) from a trusted source, the second entity receiving the second exponent ($d_2$) and the third exponent (f) from the trusted source, and the third party receiving a fourth exponent (e) from the trusted source.

In some implementations, the relationship $(d_1+d_2)e=f$ (mod $\phi(n)$) is respected, where: $\phi(\ )$denotes a totient function; and n is a modulus that is selected by the first entity and the second entity, a factorization of n being unknown to either the first entity and the second entity. The modulus is a RSA encryption modulus. The encrypted first data set is encrypted based on applying the first exponent to each data element of a first data set. Methods further include: defining a set of encrypted data elements, wherein each encrypted data element in the set of encrypted data elements is defined based on a product of an encrypted data element of the encrypted first data set and an encrypted data element of the encrypted second data set, the product being raised to the fourth exponent, and storing the set of encrypted data elements in computer-readable memory. Methods further include: receiving, from the first entity, a set intersection request, and, in response to receiving the set intersection request, transmitting the set of encrypted data elements to the first entity.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to collusion-resistant outsourcing of private set intersection. In particular, implementations include a non-interactive, encrypted computation of the set intersection using an untrusted service provider. In some implementations, two or more entities (e.g., clients) submit respective encrypted data sets to a service provider (the untrusted third party), which facilitates the computation of an intersection of the data sets. In some examples, each of the two or more entities can retrieve set intersection information from the service provider. In some examples, the service provider remains oblivious to aspects of the data sets and/or the set intersection. In some examples, the data sets that are provided to the service provider, the elements that are included in the set intersection, and/or the size of the set intersection are indiscernible to the service provider.

In accordance with implementations of the present disclosure, entities can have additional privacy requirements. In particular, entities may want to perform set intersection without revealing tuples that are outside of the intersection. Private set intersections (PSI) enables the calculation of a set intersection without revealing the non-matching items. In some examples, a PSI protocol can be used by a group of entities to determine a common preference or a matching set of information. The PSI protocol can indicate a common preference or the matching information, without disclosing any unusual preference or any private information. In some examples, PSI can be used to implement privacy-preserving data analysis.

Implementations of the present disclosure enable secure outsourcing of PSI to a third party. In some examples, the third party need not be a trusted third party. An example third party can include a cloud service provider. Cloud computing provides a resource for outsourcing the PSI computations. In some examples, cloud computing enables collaboration without all of the entities being on-line at the same time. The advent of cloud computing drives the desire to outsource such computations, but without the need to trust the service provider.

In accordance with implementations of the present disclosure, data encryptions schemes are provided to ensure that the cloud computing service provider is unable to use the received data for purposes other than those intended by an entity providing the data. In some examples, the data encryption schemes can further protect the entities even in cases where the cloud computing service provider is targeted by malicious users (e.g., hackers), thereby preventing the loss of data. Further, the data encryption schemes can be used to inhibit collusion among one or more of the entities and the third party service provider.

In accordance with implementations of the present disclosure, encryption can be used to enhance the security settings of the cloud computing services and thus enable secure, outsourced computations for PSI. In some implementations, collusion-resistant encryption can be used for the outsourced computation of the PSI. In some examples, two or more entities submit respective encrypted inputs to a service provider, and the service provider facilitates the computation of the set intersection. The collusion-resistant encryption inhibits collusion between an entity and the service provider, inhibiting the entity and the service provider from accessing data of the other entity.

In some implementations, deterministic encryption can be used. In deterministic encryption, each unencrypted data element (plaintext) always maps to the same encrypted data element (ciphertext). Consequently, and using deterministic encryption, encrypted data could be deciphered if an adversary performs a brute-force guessing attack (i.e., the adversary guesses a data value, encrypts the data value and compares the encrypted data value to the ciphertext). In this manner, the adversary is able to determine whether two ciphertext data have the same plaintext data.

In accordance with the present disclosure, outsourced PSI of encrypted inputs is protected using deterministic encryption. That is, the worst-case scenario for decryption of data by an adversary is a brute-force guessing attack. For example, if a first entity transmits first encrypted data (ciphertext) and a second entity transmits second encrypted data (ciphertext) to a third party service provider, a collusion of the second entity and service provider can occur. In accordance with the present disclosure, however, such collusion can at best use a brute-force guessing attack in an attempt to decrypt the first encrypted data based on all of the information that the colluding parties (i.e., the second entity and the service provider) have. That is, the colluding parties can perform any type of guessing attack, as in deterministic encryption, which rules out ciphertext indistinguishability (under the chosen plaintext attack). Consequently, the encryption security provided in implementations of the present disclosure can be equivalent to deterministic encryption.

By way of non-limiting example, S can be the encrypted first data set of the first entity. The third party service provider could gain access to encryption information (e.g., a public key (pk)). For example, in a collusion scenario, the second entity can provide the encryption information to the third party service provider (i.e., the second entity and the third party service provider are in collusion, and can be defined as an adversary $\mathcal{A}'$). Unaware of the collusion, the first entity can provide the encrypted first data set (ciphertext (c)) to the third party service provider for PSI determination. In this non-limiting example, x represents the input data for a correct guess of $\mathcal{A}'$ as to the plaintext value of the ciphertext, in a brute-force guessing attack.

Continuing with the non-limiting example, an advantage $(\text{Adv}_\mathcal{A})$ of $\mathcal{A}'$ in guessing data elements of the encrypted first data set can be defined as a difference between a successful guess of $\mathcal{A}'$ and an ordinary adversary ($\mathcal{A}$) (i.e., a non-colluding adversary that has access to the encrypted first data set). In some examples, $\text{Adv}_\mathcal{A}$ can be determined based on a probability of $\mathcal{A}'$ guessing the data elements and $\mathcal{A}$ guessing the data elements. In some examples, $\text{Adv}_\mathcal{A}$ can be determined based on the following example relationship:

$$\text{Adv}_\mathcal{A} = Pr[\mathcal{A}(S)=x - \mathcal{A}'(pk,c)=x]$$

In some examples, the outsourced private set intersection is considered secure, if $Adv_{\mathcal{A}}$ is negligible in a security parameter ($\lambda$). In some examples, the following security relationship can be provided:

$$Adv_{\mathcal{A}} < \frac{1}{\text{poly}(\lambda)}$$

As discussed in further detail herein, the present disclosure provides security objectives for the service provider and the data output depending on whether the output is public (i.e., discernible by the service provider) or non-public (i.e., indiscernible) by the service provider. In some examples, the security objective is confidentiality of the data input, except what can be inferred from the output (the set intersection), under arbitrary behavior and collusion. In some examples, the security objective further includes confidentiality of the output (i.e., non-public).

In accordance with the present disclosure, an example protocol can include set-up, submit, compute and retrieve stages. In some implementations, during the set-up stage, the entities can obtain respective keys for encryption of the respective data sets. In some examples, keys can be distributed using a secure computation protocol and/or by a trusted dealer. In some implementations, during the submit stage, each of the entities encrypts one or more data sets and submits the encrypted data sets to the service provider. In some implementations, during the compute stage, the service provider uses the encrypted data sets from each of the entities to perform computation of the data set intersection. Depending on the security objectives (e.g., public, non-public), the service provider might learn details of the intersection. In some implementations, during the retrieve stage, the entities can retrieve the data set intersection and/or information relating to data set intersection. Depending on the security objectives, data retrieval may be interactive or non-interactive.

In accordance with the present disclosure, the confidentiality of an entity's data could be protected during an interaction with an adversary unifying the roles of another entity and the server provider (e.g., $\mathcal{A}'$). According to the example protocol, and in a collusion scenario, the entity executes the setup algorithm and hands the keys to the adversary instead of handing them to the other entity and the service provider. Next, the entity simulates the submit algorithm and sends the (encrypted) input to the adversary. After the entity simulates the retrieve algorithm the adversary will guess the entity's input data.

The security of the two entities input is interchangeable, since they perform similar operations. The service provider has no input and therefore collusion between the two entities can reveal no new information. Consequently, this example illustrates the entire security objectives for the input of the protocol in the present disclosure. This example indicates that the disclosed protocol is as secure as a deterministic one-way function, e.g. a public-key encryption scheme.

Figure 1:
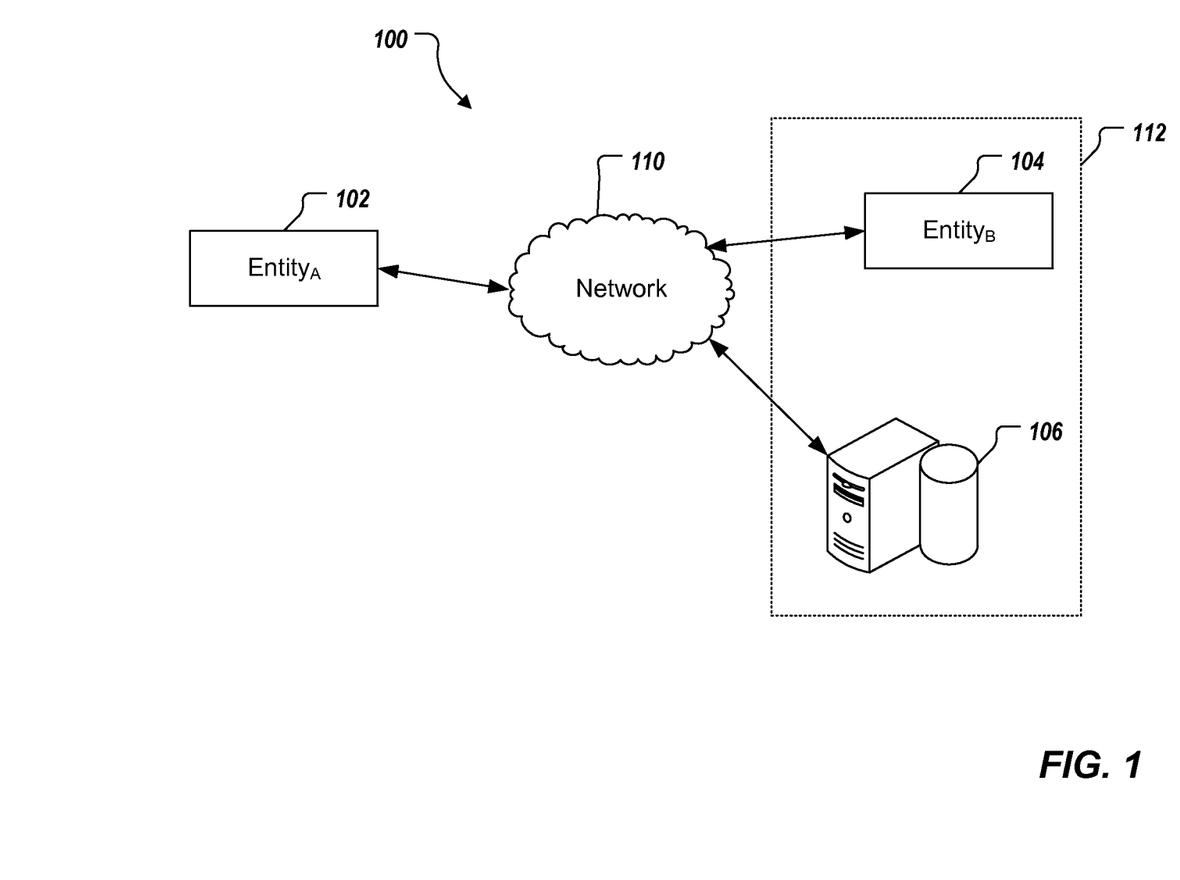
FIG. 1 is a block diagram of an example system architecture that can execute implementations of the present disclosure.

Referring now to FIG. 1, an example architecture 100 includes entities 102, 104, a service provider 106, and a network 110. Each entity 102, 104 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. Entities can be clients, each having a set of database tuples. In accordance with implementations of the present disclosure, the number of entities can be greater than two.

The entities 102, 104 are connected to a service provider 106 via the network 110. The network 110 can be either private or public. In some implementations, the entities can communicate wirelessly through a communication interface, which can include digital signal processing circuitry where necessary. The communication interface can provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication can occur through a radio-frequency transceiver (not shown). In addition, short-range communication can occur, such as using a Bluetooth, WiFi, or other such transceiver.

In some implementations, the architecture 100 can be a distributed client/server system that spans one or more networks such as network 110. The network 110 can be a large computer network, such as a local area network (LAN), wide area network (WAN), the Internet, a cellular network, or a combination thereof connecting any number of mobile clients, fixed clients, and servers. In some implementations, each client (e.g., entity 102, 104) can communicate with service provider (e.g., 106) via a virtual private network (VPN), Secure Shell (SSH) tunnel, or other secure network connection. In some implementations, the network 110 may include a corporate network (e.g., intranet) and one or more wireless access points.

The service provider 106 can represent various forms of servers including, but not limited to a web server, an application server, a proxy server, a network server, or a server farm. For example, the service provider 106 can be an application server that executes software provided by a software vendor entity. The service provider 106 can provide data storage and/or PSI services.

In the illustrated example, the connections between the entities 102, 104 and the network 110 and between the network 110 and the service provider 106 are bilateral. Consequently, data sets can be transferred through the network 110 to and from any element of the architecture. For example the entities 102, 104 can submit data sets to the service provider 106. The service provider 106 can perform PSI calculations and the entities 102, 104 can retrieve set intersection information from the service provider. In some examples, an adversary entity 112 can be provided, where the adversary entity includes the entity 104 and the service provider 106 colluding with one another.

By way of non-limiting example, implementations of the present disclosure will be discussed in reference to the example architecture 100 of FIG. 1. It is appreciated, however, that implementations of the present disclosure can be realized using any appropriate architecture with various numbers of entities and/or service providers.

In implementations of public output, the service provider (e.g., the service provider 106) is able to learn details of the set intersection. In some examples, the service provider can learn values of the data elements included in the set intersection, as well as the size of the set intersection. In some examples, disclosure of details of the set intersection can be useful for subsequent computations by the service provider.

By way of non-limiting example, two entities (e.g., entities 102, 104) have respective input data sets $\vec{x}=x_1, \ldots, x_v$ (first data set) and $\vec{y}=y_1, \ldots, y_w$ (second data set), for which the entities would like PSI with public output to be performed. For this purpose, and during the set-up stage, a keyed hash function can be chosen and can be provided to both entities. An example hash function can be provided as:

$$H(\ ):\{0,1\}^m \rightarrow \{0,1\}^{l+m}$$

where m is the bit length of the encoding of the domain of x.

During the submit stage, the first data set and the second data set can each be encrypted based on the keyed hash function using the chosen key. In some examples, a bit-wise exclusive-or logical operation (represented using ⊕) can be used to encrypt the data sets. Consequently, an encrypted first data set (e.g., $\vec{x'}=H(x_1), \ldots, H(x_v)$) and an encrypted second data set (e.g., $\vec{y'}=y_1 \oplus H_2(y_1), \ldots, y_w \oplus H_2(y_w)$) can be provided. The encrypted first data set and the encrypted second data set are separately submitted by the two entities to the service provider.

During the compute stage, the service provider computes a cross-product of the encrypted first data set and the encrypted second data set to provide a plurality of bit strings. An example cross-product can be represented using:

$$\vec{x'}\vec{y'} = x'_1 \oplus y'_1, \ldots, x'_v \oplus y'_w$$

Each bit string can be associated with an encrypted data element pair which contains both an encrypted data element of the encrypted first data set and an encrypted data element of the encrypted second data set.

During the compute stage, and for each encrypted data element pair, the service provider interprets the first l bits of an associated bit string and, if they are each equal to a first value (e.g., zero), the service provider adds the next m bits of the associated bit string as a data element (e.g., z) to the set intersection. In some implementations, the m bits of the associated bit string can be an unencrypted data element (plaintext) that is included in each of the first data set and the second data set, providing a public output.

In some implementations, and in accordance with deterministic encryption, if an un-encrypted data element in the first data set (e.g., $x_i$) is equal to an un-encrypted data element in the second data set (e.g., $y_j$), the corresponding encrypted data element of the encrypted first data set (e.g., $H(x_i)$) is equal to the corresponding encrypted data element of the encrypted second data set (e.g., $H_j$). Consequently, the service provider adds the associated bit string (e.g., $z=\{H(x_i)\oplus(y_j \oplus H(y_j))\}_{l+m}^l = y_j$) as a data element to the set intersection. In some examples, if a data element of the first data set and a data element of the second data set are different (i.e., $x_i \neq y_j$), the probability (e.g., $\Pr[\{H(x_i)\oplus H(y_j)=0\}_l^0]=2^{-l}$) of adding a false element to the set intersection is negligible.

In some implementations, the computation can be non-interactive, for example the two entities can submit their encrypted data sets to the service provider independently, at different times and can retrieve the set intersection after computation.

In some implementations, the communication complexity can be directly related to the size of the data sets submitted by the entities. The communication complexity during retrieval is linear in the number of elements in the set intersection. The computation complexity during computation can remain equal to O(v+w), if the service provider uses a hash table to match the encrypted data sets, where v is the number of items in the first data set and w is the number of items in the second data set.

As discussed above, implementations of the present disclosure are at least secure as deterministic encryption. This security can be shown by way of an example security proof, where the keyed hash function H can be provided as a random oracle, which can adaptively change its output for any future query. An adversary $\mathcal{A}$ with $\text{Adv}_{\mathcal{A}}$ could gain access via an algorithm $\mathcal{B}$ to H(x) and the oracle. Given H(x), the probability of correctly outputting a plaintext data element (x) is at most $$\frac{q}{2m}.$$

If $\mathcal{B}$ receives a query from $\mathcal{A}$, $\mathcal{B}$ forwards the query to the oracle and returns the result. The adversary $\mathcal{A}$ outputs a guess $\tilde{x}$ of $\mathcal{B}$'s input. The algorithm $\mathcal{B}$ outputs $\tilde{x}$ as a guess of x. The advantage $\text{Adv}_{\mathcal{A}}$ of an adversary $\mathcal{A}$ in the outsourced private set intersection is at most 0. In some examples, the security settings can be improved through semi-honest submission of the encrypted data sets to the service provider, by including random numbers from an oracle, where the service provider does not have access to the oracle.

In some examples, the communication between the entities and the service provider can be limited to a single protocol or the protocol can be performed multiple times. For example, the entities might want to submit updated data sets at multiple time points, enabling the service provider to repeatedly compute the set intersection using updated data sets. The repeated data submission enables the entities to retrieve updated set intersections.

In implementations of non-public output, the service provider (e.g., the service provider 106) does not have details of the set intersection, enabling the highest level of security in outsourcing. In some examples, the service provider remains unaware of the size of the set intersection and/or values of data elements provided in the set intersection. By way of non-limiting example, a first entity (e.g., the entity 102) has a first data set (e.g., $\vec{x}=x_1, \ldots, x_v$) and the second entity (e.g., the entity 104) has a second data set (e.g., $\vec{y}=y_1, \ldots, y_w$). During the set-up stage, a trusted source is used to generate multiple encryption exponents that can be provided as $d_1$, $d_2$, e and f. The first entity receives the first exponent ($d_1$) and the third exponent (f) from the trusted source. The second entity receives the second exponent ($d_2$) and the third exponent (f) from the trusted source. The service provider receives the fourth exponent (e) from the trusted source. In some examples, the exponents can be generated, such that:

$$(d_1+d_2)e = f(\bmod\ \phi(n))$$

where $\phi(\ )$ denotes a totient function and n is a modulus that is selected by the first entity and the second entity. In some examples, a factorization of n is unknown to either the first entity or the second entity. In some implementations, the modulus can be a RSA encryption modulus.

During the submit stage, the entities encrypt their corresponding data sets (e.g., $\vec{x}$ and $\vec{y}$) using the first exponent ($d_1$) and the second exponent ($d_2$), respectively. For example, the first entity encrypts the first data set to provide an encrypted first data set (e.g., $\vec{x'}=x_1^{d_1}, \ldots, x_v^{d_1}\ (\bmod\ n)$), and the second entity encrypts the second data set to provide an encrypted second data set (e.g., $\vec{y'}=y_1^{d_2}, \ldots, y_w^{d_2} \pmod{n}$). The first entity and the second entity respectively submit the encrypted first and second data sets to the service provider.

In some examples, during the compute stage, the service provider computes a v×w cross-product of the encrypted first and second data sets as:

$$\vec{z}=\vec{x'}\vec{y'}=(x'_1 y'_1)^e, \ldots, (x'_v y'_w)^e \pmod{n}.$$

During the retrieve stage, and using the first entity as an example, the first entity computes:

$$\vec{x''}=x_1^f, \ldots, x_v^f \pmod{n}$$

which is used to determine the PSI. More particularly, the first entity and the service provider engage in a regular, private set intersection protocol, with the sets $\vec{x''}$ and $\vec{z}$, respectively. For each element in the intersection (i.e., $\vec{x''} \cap \vec{z}$), the first entity retrieves the respective element from $\vec{x}$ to the result set. The second entity can also engage in PSI with the service provider and, through similar steps, the second entity can retrieve the elements of the intersection.

In some implementations, and in accordance with deterministic encryption, if an un-encrypted data element in the first data set (e.g., $x_i$) is equal to an un-encrypted data element in the second data set (e.g., $y_i$), calculation of their cross-product leads to $z=(z_1^{d_1} y_j^{d_2})^e = x_i^f = y_j^f$. Accordingly, the entities will retrieve z in the PSI protocol and add $x_i$ and $y_j$, respectively, to the result set. In some examples, In some examples, if a data element of the first data set and a data element of the second data set are different (i.e., $x_i \neq y_j$), the probability (e.g., $\Pr[z \in \vec{x''}]=2^{-k}$) of adding a false element to the result set is negligible.

In accordance with implementations of non-public output, the two entities submit respective encrypted inputs to the service provider, which performs a cross-product computation. The PSI protocol includes one round of interaction. The communication complexity is given by the number of elements submitted by the two entities, O(v+w), and the size k of elements' bits. The communication complexity during retrieval can be provided as O(vw). The computation complexity during computation of the intersection is also quadratic O(vw). In some aspects of this implementation, the communication complexity leads to optimal performance.

As discussed above, implementations of the present disclosure are at least secure as deterministic encryption. This security can be shown by way of an example security proof, where the service provider does not have access to the intersection and a RSA encryption modulus. It is difficult to compute the non-encrypted data x from an encrypted data provided as $c=x^{\tilde{e}}$. The probability of guessing the non-encrypted data x can be provided as:

$$\Pr[\mathcal{A}(c, e) = m] < \frac{1}{\text{poly}(k)}$$

where, k represents the security parameter.

If an adversary $\mathcal{A}$ with $\text{Adv}_\mathcal{A}$ attempts to gain access to the private data sets via an algorithm $\mathcal{B}$ and the RSA encryption modulus, the probability of success will also be $\text{Adv}_\mathcal{A}$. If the algorithm $\mathcal{B}$ is given an RSA challenge of encrypted data c and exponent $\tilde{e}$, the algorithm $\mathcal{B}$ chooses random numbers $d_2$ and e and computes an exponent f (e.g., based on $f=(\tilde{e}+d_2)$ e). The algorithm $\mathcal{B}$ submits c as its input and simulates a PSI protocol with an arbitrarily chosen element. The adversary $\mathcal{A}$ outputs its guess $\tilde{x}$ of $\mathcal{B}$'s input. The algorithm $\mathcal{B}$ outputs $\tilde{x}$ as its guess of x. Accordingly, the advantage $\text{Adv}_\mathcal{A}$ of an adversary $\mathcal{A}$ in the outsourced PSI is at most 0.

Figure 2:
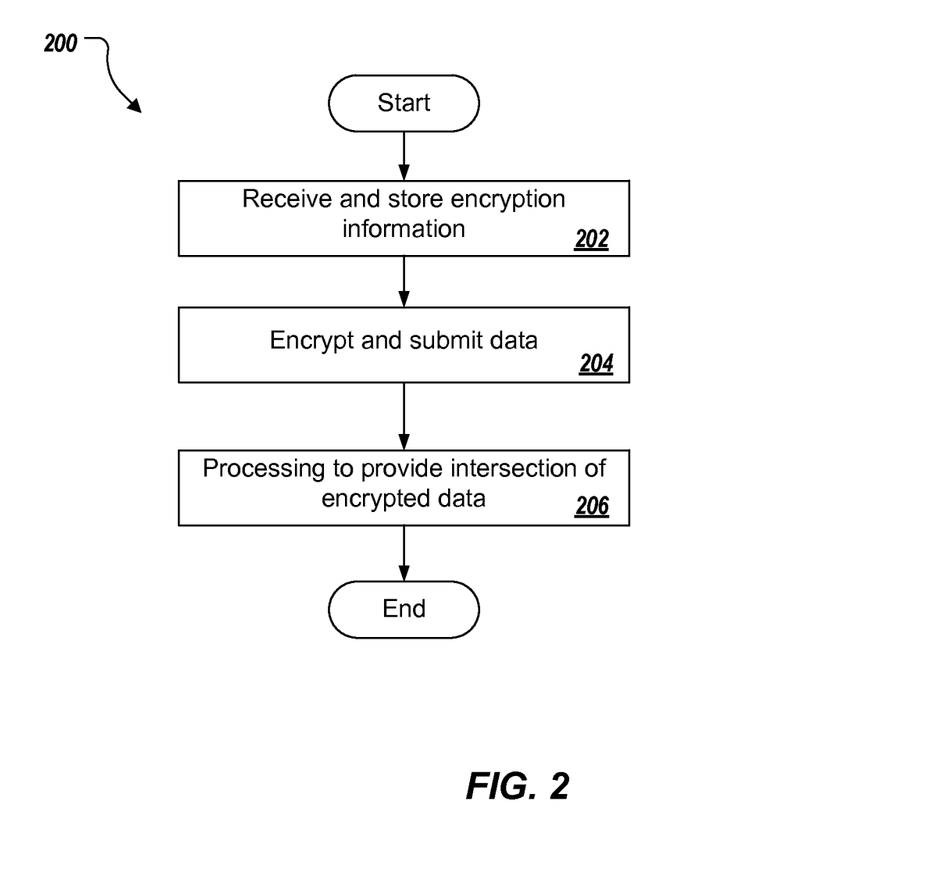
FIG. 2 is a flowchart depicting an example process that can be executed in accordance with implementations of the present disclosure.

FIG. 2 is a flowchart depicting an example process 200 that can be executed in accordance with implementations of the present disclosure. In some examples, the example process 200 can include operations that are performed using one or more computer programs executed using one or more data processing apparatus (e.g., one or more client-side computing devices and/or one or more server-side computing devices).

Encryption information is received and stored (202). In some examples, the encryption information can be selected by the entities 102, 104 in FIG. 1 and/or a third party. In some examples, the encryption information can include public-key encryption information. In some examples, the encryption information can include private-key encryption information. Each entity uses the encryption information to encrypt respective data sets and submit the respective, encrypted data sets (204). The encrypted data sets are processed to provide set intersection information (206). In some examples, the set intersection information includes the intersection of the data elements of the respective data sets. In some examples, the set intersection information can enable each of the entities to calculate the intersection of the data elements of the respective data sets.

Figure 3:
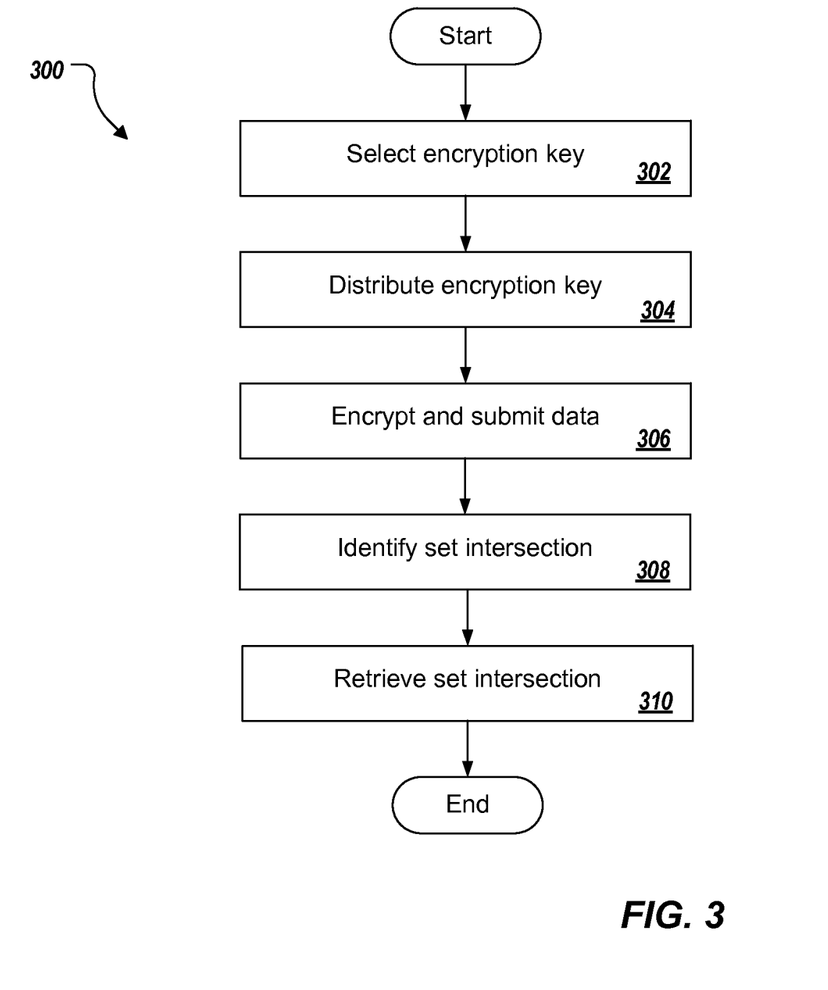
FIG. 3 is a flowchart depicting an example process that can be executed in accordance with implementations of the present disclosure.

FIG. 3 is a flowchart depicting an example process 300 that can be executed in accordance with implementations of the present disclosure. In some examples, the example process 300 can include operations that are performed using one or more computer programs executed using one or more data processing apparatus (e.g., one or more client-side computing devices and/or one or more server-side computing devices). In some examples, the example process 300 is an example PSI protocol with public output. In some implementations public output could be useful for assisting subsequent computations of PSI.

A key for an encryption hash function is selected (302). The selected encryption key is distributed (304). In some examples, the key is distributed to the entities 102 and 104 in FIG. 1. Each entity uses the encryption key and the hash function to encrypt their respective data sets and submits the encrypted data sets (306). For example, the entities 102, 104 encrypt respective data sets and provide the encrypted data sets to the service provider 106 in FIG. 1. The service provider identifies the set intersection (308). In some examples, the set intersection is not encrypted. Consequently, the service provider can be aware of the size of the set intersection and values of the data elements included in the set intersection. The set intersection is retrieved (310). For example, each of the entities can retrieve the set intersection from the service provider.

Figure 4:
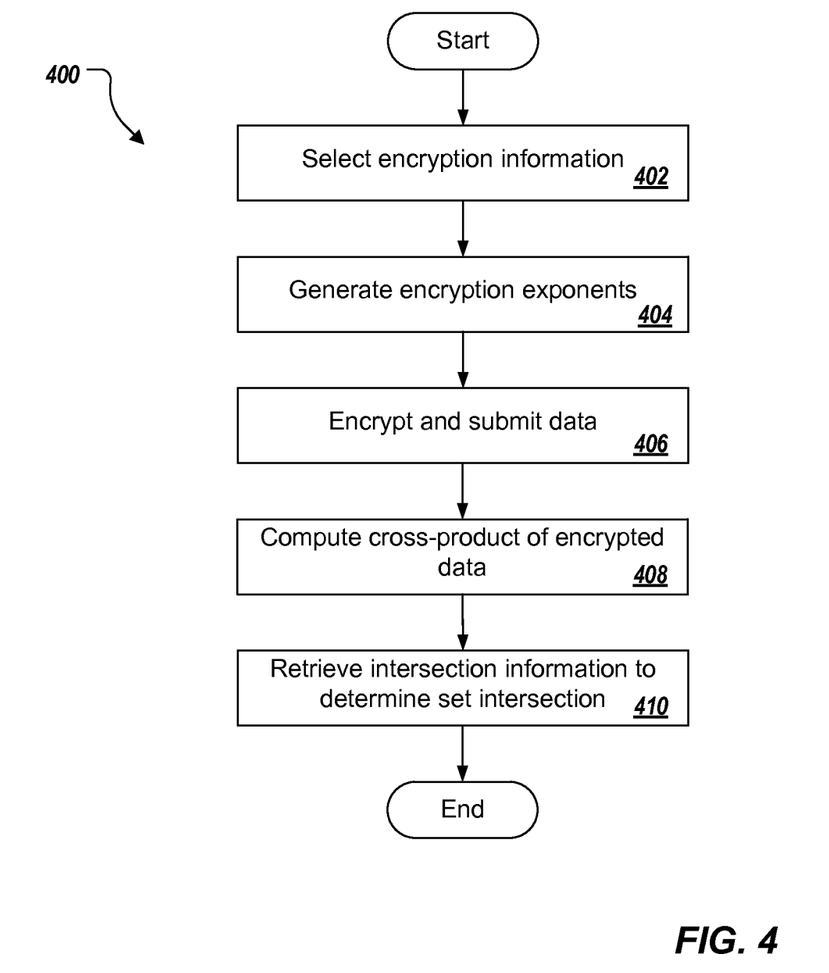
FIG. 4 is a flowchart depicting an example process that can be executed in accordance with implementations of the present disclosure.

FIG. 4 is a flowchart depicting an example process 400 that can be executed in accordance with implementations of the present disclosure. In some examples, the example process 400 can include operations that are performed using one or more computer programs executed using one or more data processing apparatus (e.g., one or more client-side computing devices and/or one or more server-side computing devices). The example process 400 is an example PSI protocol with non-public output. In some implementations non-public output could be useful to ensure maximum security of data, while using outsourced PSI.

Encryption information is selected (402). In some examples, the encryption information can include an RSA modulus jointly chosen by the entities 102, 104 in FIG. 1. Encryption exponents are generated (404). In some examples, a specialized protocol or a generic secure computation (e.g., from a trusted source) can be used to generate the encryption exponents. In some examples, the encryption exponents include public and non-public exponents that each entity can use to encrypt respective data sets, and that the service provider can use to generate set intersection information. Each entity uses respective encryption exponents to encrypt their respective data set and submits the encrypted data set (406). For example, the entities 102, 104 encrypt respective data sets and provide the encrypted data sets to the service provider 106 in FIG. 1. A cross-product of the encrypted data sets is computed to provide set intersection information (408). For example, the service provider uses an encryption exponent to compute the cross-product of encrypted data sets. According to this aspect of the disclosure, the output of the PSI is encrypted set intersection information. Each entity uses a public encryption exponent to encrypt their respective data set and engages in a regular, PSI protocol with the service provider to determine the set intersection (410).

PSI in accordance with implementations of the present disclosure can be used in various use cases. By way of non-limiting example, implementations of PSI can be used to handle a no-fly list between a security entity (e.g., a first entity) and an airline (e.g., a second entity). In some examples, the first entity has an interest in not revealing the members of the no-fly list and, at least for privacy reasons, it would be beneficial to not reveal passengers that are not on the no-fly list. The first entity and the second entity can achieve this using PSI. For example, in the case of a no-fly-list, the encrypted computation enables any untrusted third party to host an encrypted no-fly list provided by the first entity. The second entity can submit an encrypted passenger list and retrieve the intersection. In this example, any interaction would only take place between the third party and the second entity.

Figure 5:
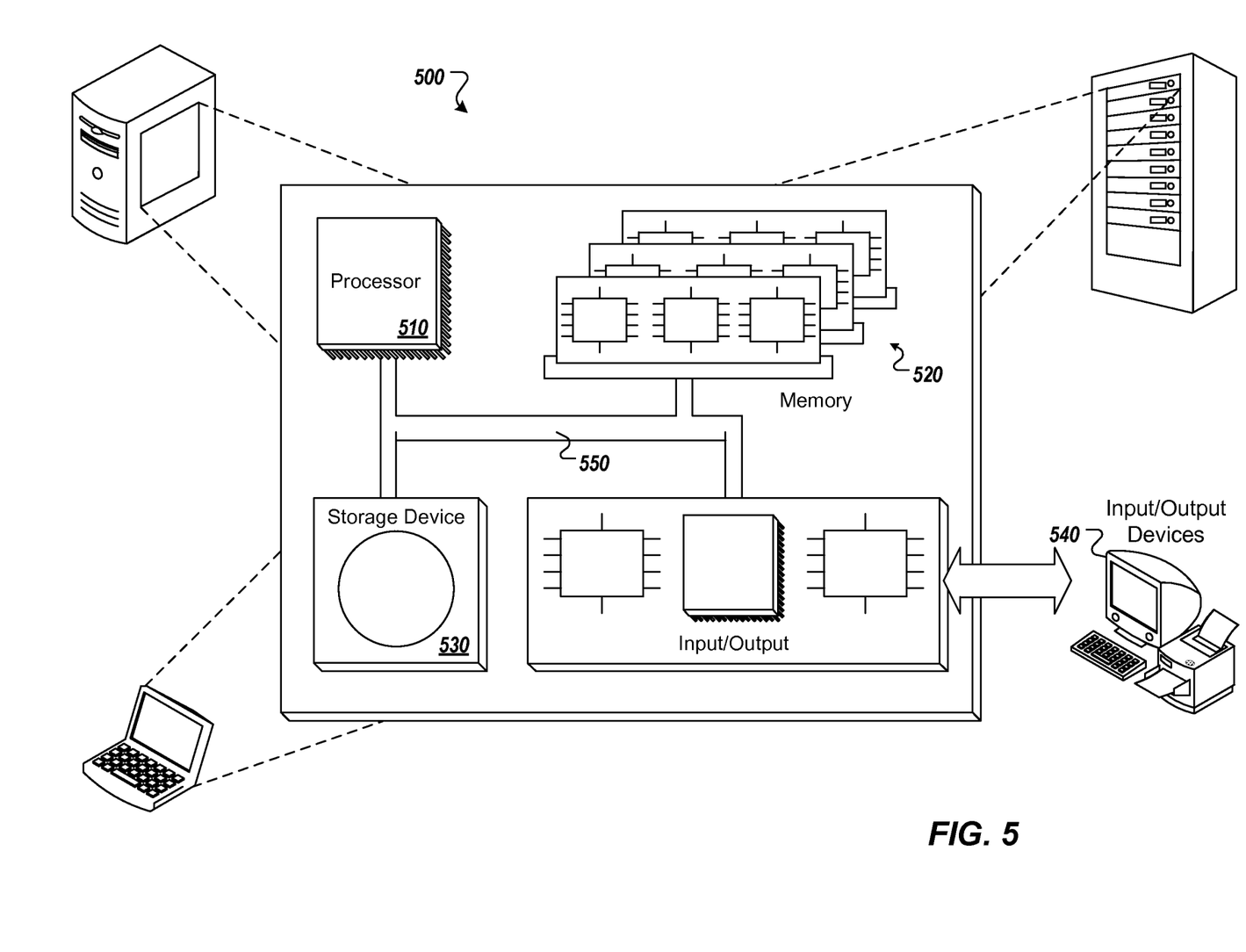
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include entities and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for determining a set intersection using a third party, the method being executed using one or more processors and comprising:
receiving an encrypted first data set from a first entity;
storing the encrypted first data set in computer-readable memory;
receiving an encrypted second data set from a second entity;
storing the encrypted second data set in computer-readable memory;
receiving public encryption information associated with the encrypted first data set and the encrypted second data set;
storing the public encryption information in computer-readable memory; and
processing, using the one or more processors, the encrypted first data set and the encrypted second data set to provide the set intersection, wherein:

$$Adv_A < \frac{1}{\text{poly}(\lambda)}$$

where:
γ is a security parameter;
poly( ) refers to any positive polynomial; and
$Adv_A$ is provided as an advantage of a first adversary in guessing data elements of the encrypted first data set and is determined based on a probability of the first adversary guessing the data elements and a second adversary guessing the data elements, the first adversary comprising the third party and the second entity, and the second adversary having access to the encrypted first data set and the public encryption information.

2. The method of claim 1, wherein $Adv_A$ is calculated as:

$$Adv_A = Pr[A(S) = x - A'(pk, c) = x]$$

where:
A is the first adversary;
S represents messages of the first entity received by the third part;
A' is the second adversary;
pk is the public encryption information;
c is an encrypted data element included in the encrypted first data set;
x is a correct guess of a value of an unencrypted data element associated with the encrypted data element; and Pr[ ] is a mathematical notation indicating a probability calculation.

3. The method of claim 1, wherein a first data set is encrypted using a key to provide the encrypted first data set and a second data set is encrypted using the key to provide the encrypted second data set.

4. The method of claim 3, wherein the first data set and the second data set are each encrypted based on a keyed hash function using the key.

5. The method of claim 3, wherein the processing, using the one or more processors, the encrypted first data set and the encrypted second data set to provide the set intersection comprises:
calculating a cross-product of the encrypted first data set and the encrypted second data set to provide a plurality of bit strings, each bit string associated with an encrypted data element pair comprising an encrypted data element of the encrypted first data set and an encrypted data element of the encrypted second data set; and
for one or more encrypted data element pairs:
determining that first l bits of an associated bit string are each equal to a first value and, in response, adding next m bits of the associated bit string as a data element of the set intersection.

6. The method of claim 5, wherein the first value is zero.

7. The method of claim 5, wherein the m bits of the associated bit string defines an unencrypted data element that is included in each of the first data set and the second data set.

8. The method of claim 1, wherein the encrypted first data set is encrypted based on a first exponent ($d_1$) and the encrypted second data set is encrypted based on a second exponent ($d_2$), the first entity receiving the first exponent ($d_1$) and a third exponent (f) from a trusted source, the second entity receiving the second exponent ($d_2$) and the third exponent (f) from the trusted source, and the third party receiving a fourth exponent (e) from the trusted source.

9. The method of claim 8, wherein:

$$(d_1 + d_2)e = f \pmod{\phi(n)}$$

where:
φ( ) denotes a totient function; and
n is a modulus that is selected by the first entity and the second entity, a factorization of n being unknown to either the first entity and the second entity.

10. The method of claim 9, wherein the modulus is a RSA encryption modulus.

11. The method of claim 8, wherein the encrypted first data set is encrypted based on applying the first exponent to each data element of a first data set.

12. The method of claim 8, further comprising:
defining a set of encrypted data elements, wherein each encrypted data element in the set of encrypted data elements is defined based on a product of an encrypted data element of the encrypted first data set and an encrypted data element of the encrypted second data set, the product being raised to the fourth exponent; and
storing the set of encrypted data elements in computer-readable memory.

13. The method of claim 12, further comprising:
receiving, from the first entity, a set intersection request; and
in response to receiving the set intersection request, transmitting the set of encrypted data elements to the first entity.

14. A non-transitory computer-readable storage medium coupled to one or more processors and having instructions stored thereon which, when executed by the one or more processors, cause the one or more processors to perform operations for determining a set intersection using a third party, the operations comprising:

receiving an encrypted first data set from a first entity;
storing the encrypted first data set;
receiving an encrypted second data set from a second entity;
storing the encrypted second data set;
receiving public encryption information associated with the encrypted first data set and the encrypted second data set;
storing the public encryption information; and
processing, using the one or more processors, the encrypted first data set and the encrypted second data set to provide the set intersection, wherein:

$$Adv_A < \frac{1}{\text{poly}(\lambda)}$$

where:
γ is a security parameter;
poly( ) refers to any positive polynomial; and
$Adv_A$ is provided as an advantage of a first adversary in guessing data elements of the encrypted first data set and is determined based on a probability of the first adversary guessing the data elements and a second adversary guessing the data elements, the first adversary comprising the third party and the second entity, and the second adversary having access to the encrypted first data set and the public encryption information.

15. A system, comprising:
a computing device; and
a computer-readable storage device coupled to the computing device and having instructions stored thereon which, when executed by the computing device, cause the computing device to perform operations for determining a set intersection using a third party, the operations comprising:
storing the encrypted first data set;
receiving an encrypted second data set from a second entity;
storing the encrypted second data set;
receiving public encryption information associated with the encrypted first data set and the encrypted second data set;
storing the public encryption information; and
processing, using the one or more processors, the encrypted first data set and the encrypted second data set to provide the set intersection, wherein:

$$Adv_A < \frac{1}{\text{poly}(\lambda)}$$

where:
γ is a security parameter;
poly( ) refers to any positive polynomial; and
$Adv_A$ is provided as an advantage of a first adversary in guessing data elements of the encrypted first data set and is determined based on a probability of the first adversary guessing the data elements and a second adversary guessing the data elements, the first adversary comprising the third party and the second entity, and the second adversary having access to the encrypted first data set and the public encryption information.

16. The computer-readable storage medium of claim 14, wherein a first data set is encrypted using a key to provide the encrypted first data set and a second data set is encrypted using the key to provide the encrypted second data set.

17. The computer-readable storage medium of claim 16, wherein the first data set and the second data set are each encrypted based on a keyed hash function using the key.

18. The computer-readable storage medium of claim 14, wherein the encrypted first data set is encrypted based on a first exponent ($d_1$) and the encrypted second data set is encrypted based on a second exponent ($d_2$), the first entity receiving the first exponent ($d_1$) and a third exponent (f) from a trusted source, the second entity receiving the second exponent ($d_2$) and the third exponent (f) from the trusted source, and the third party receiving a fourth exponent (e) from the trusted source.

19. The system of claim 15, wherein a first data set is encrypted using a key to provide the encrypted first data set and a second data set is encrypted using the key to provide the encrypted second data set.

20. The system of claim 19, wherein the first data set and the second data set are each encrypted based on a keyed hash function using the key.

* * * * *